April 13, 1965   H. M. RUSSELL-FRENCH   3,177,809
SEMI-FIXED ARTILLERY ROUND

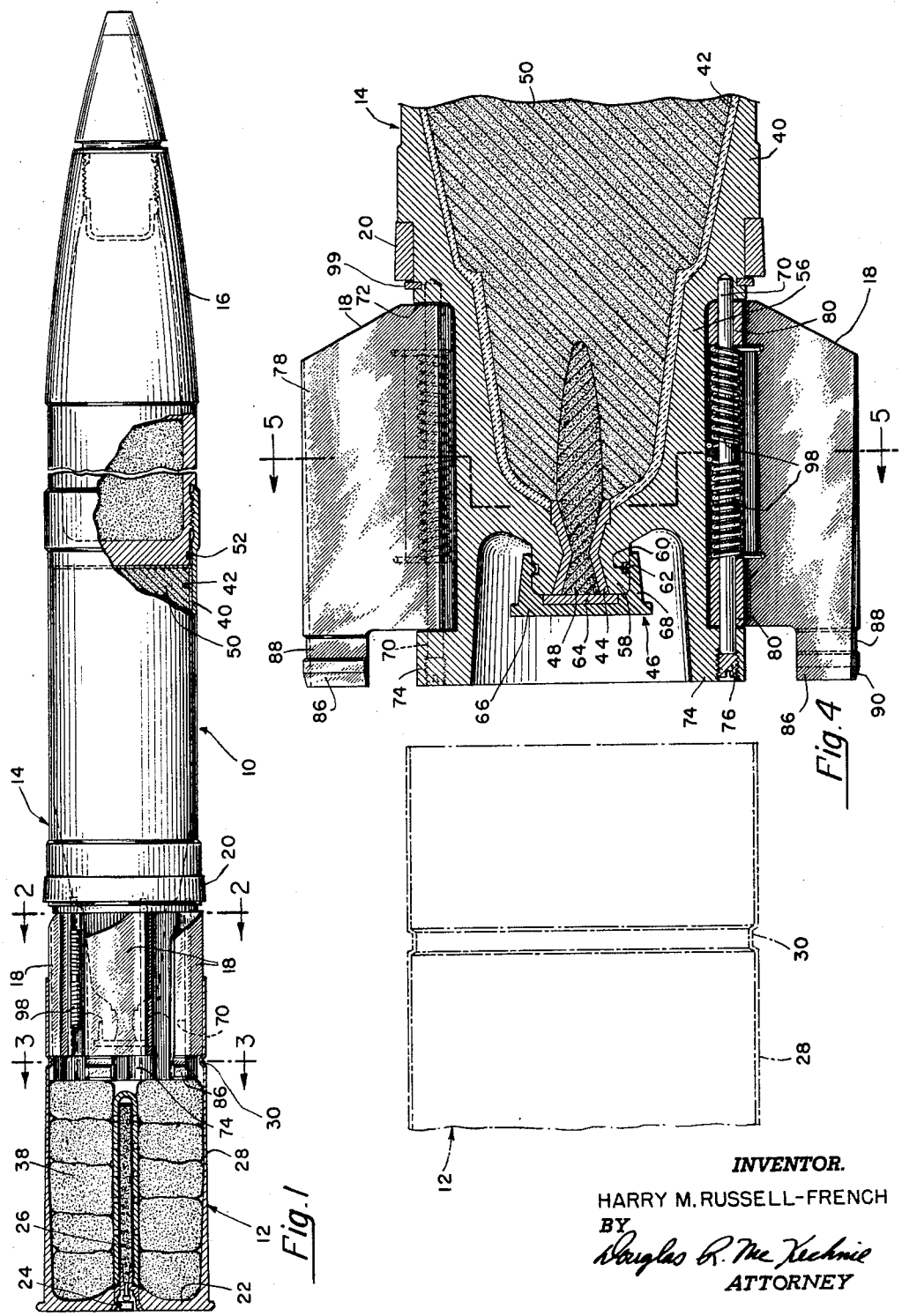

Filed July 24, 1962   3 Sheets-Sheet 2

INVENTOR.
HARRY M. RUSSELL-FRENCH
BY
Douglas R. McKechnie
ATTORNEY

April 13, 1965   H. M. RUSSELL-FRENCH   3,177,809
SEMI-FIXED ARTILLERY ROUND
Filed July 24, 1962                         3 Sheets-Sheet 3

INVENTOR.
HARRY M. RUSSELL-FRENCH
ATTORNEY

_United States Patent Office_

3,177,809
Patented Apr. 13, 1965

3,177,809
SEMI-FIXED ARTILLERY ROUND
Harry M. Russell-French, Philadelphia, Pa., assignor to The Budd Company, Philadelphia, Pa., a corporation of Pennsylvania
Filed July 24, 1962, Ser. No. 212,111
7 Claims. (Cl. 102—49)

This invention relates to semi-fixed artillery rounds of the rocket-assisted, fin-stabilized type.

In the past, artillery rounds have been devised which comprise a cartridge case enclosing a booster propellant that, upon firing, expels a projectile or warhead having a rocket motor attached thereto. When fired, the rocket motor ignites and propels the warhead along a portion of its trajectory so that after the rocket motor burns out, the warhead follows a ballistic path.

It has been customary to design the rocket motor to provide a high-thrust over a relatively short period of time so that the warhead, after acceleration by both the booster propellant and the rocket, travels at supersonic speeds. But, because high drag forces are encountered at supersonic speeds, proposals have been made to increase the range of a round by taking advantage of the fact that the drag forces encountered when the warhead travels at transonic velocities are considerably less than those encountered at supersonic velocities.

Accordingly, one of the objects of the invention is to provide a long range, rocket assisted artillery round. It is contemplated that this object be achieved by proportioning the booster propellant charge and the rocket propellant so that upon firing, the rocket is accelerated to a transonic velocity by the booster propellant and thereafter the rocket motor provides a thrust for 30% to 40% of the trajectory which thrust merely balances the drag forces at the design velocity.

It has been found that when such a round is fired for maximum range with the gun at a high elevation, minor adjustments in the range can be obtained by varying the angle of gun elevation. However, in order to obtain major changes in the range, it is necessary to vary the launch velocity by adjusting the amount of booster propellant charge. Therefore, another object of the invention is to provide a semi-fixed artillery round which can be readily dismantled to adjust the amount of booster propellant.

Still another object of the invention is to provide a semi-fixed, fin stabilized artillery round wherein the fins are detachably coupled to the cartridge case so that the warhead will not be jarred loose from the case in those instances where such rounds are stored in magazines subject to shock caused by the firing of a preceding round and so that upon ignition of the booster propellant charge, pressure builds up in the gun chamber prior to movement of the warhead.

Other objects and advantages will be apparent from the following description taken in connection with the accompanying drawings wherein:

FIGURE 1 is a side view, partly in section and with portions removed, of an artillery round embodying the invention;

FIGURES 2 and 3 are transverse sectional views taken along lines 2—2 and 3—3, respectively, of FIGURE 1, illustrating the fins in their retracted positions;

FIGURE 4 is a longitudinal sectional view through the rear portion of the rocket motor and along lines 4—4 of FIGURE 5, illustrating the fins in a flight stabilizing position and showing the relationship of the extended fins to the size of the case;

Figure 5:
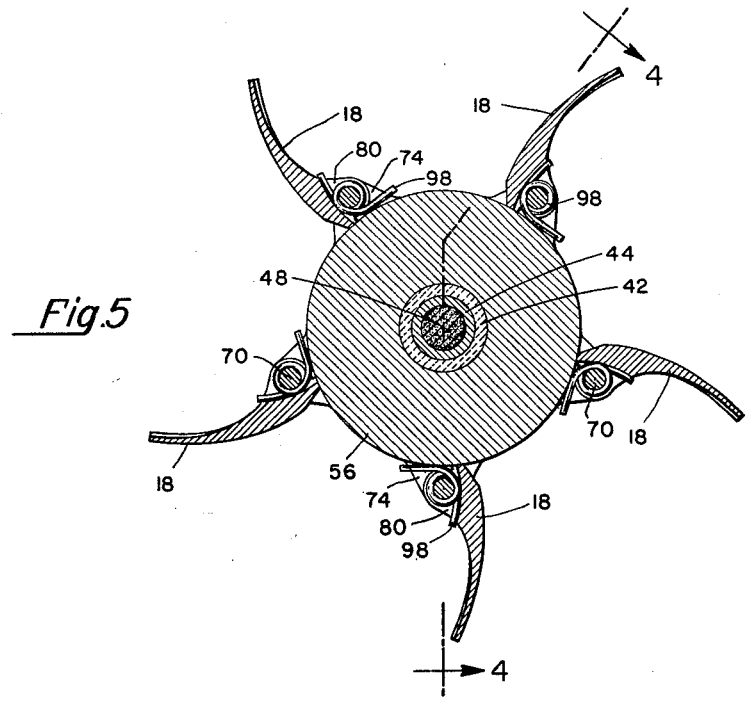
FIGURE 5 is a transverse sectional view along lines 5—5 of FIGURE 4.

Referring now to the drawings, there is shown a semi-fixed, fin stabilized, rocket assisted, artillery round 10 comprising a cartridge case 12 and a projectile assembly including a sustainer rocket motor 14, a warhead 16 attached to the front of motor 14, a plurality of retractible, stabilizing fins 18 carried by the rear of the rocket motor, and a slip obturator 20.

Cartridge case 12 has a transverse base 22 that supports a primer 24 and an igniter tube 26. Case 12 also has a tubular body 28 which is closed at one end by the base and is open at its other end. Adjacent to its open end, body 28 is crimped inwardly to provide an annular, inwardly extending ridge 30 having on its inner surface an annular, cylindrical portion 32 bounded at its front end and its rear end by oppositely tapered shoulders 34 and 36 respectively. Portion 32 is of a uniform diameter less than that of the adjacent portions of the case body.

Cartridge case 12 contains a load or charge of booster propellant 38 in the form of bags of granules of powder. Upon ignition of the primer and the igniter tube, booster propellant 38 ignites and expels the projectile assembly from the gun tube. The amount and type of booster propellant are chosen so that the projectile assembly is launched with a velocity in the neighborhood of Mach 1 where the drag forces are relatively low in comparison to those encountered at relatively high supersonic speeds. Furthermore, the amount of the charge initially loaded into the cartridge case is a maximum amount for maximum range so that some of the charge can be removed to decrease the range.

Rocket motor 14 comprises a motor case 40, a thermal insulator 42 lining the interior of case 40, a nozzle 44, a nozzle cover 46, a pyrotechnic fuze 48 and a sustainer propellant charge 50. The front end of case 40 is threaded and is screwed onto the threaded rear portion of the warhead, there being an O-ring seal 52 between the case 40 and warhead 16.

The sustainer propellant charge is chosen to provide a low-thrust, long burning rocket motor characteristic. That is, the sustainer propellant charge 50 burns for 30% to 40% of the trajectory and provides a thrust which substantially balances the drag forces. Since the sustainer propellant charge is fixed, it will be obvious that at different launch velocities the thrust will not exactly balance the drag forces but it is chosen so that the thrust will not, at any launch velocity, sufficiently overcome the drag forces to cause acceleration of the projectile above its launch velocity and significantly into the supersonic region.

Motor case 40 includes a tubular body and a tail 56 which is attached to the rear end of the body. Tail 56 has a rearwardly extending nipple 58 that supports nozzle 44 along the axis of the motor whereby the reactant products from propellant 50 are directed axially and rearwardly from the nozzle.

Nipple 58 has an outwardly opening, annular groove 60 which receives an annular bead 62 on cover 46 to detachably secure the cover across nozzle 44. Cover 46 includes a flat, circular plate 64 which abuts the flat, annular, rear faces of nozzle 44 and nipple 58; a cap 66 supporting plate 64; and a tubular sleeve 68 which fits over the nipple 58 and is integral with bead 62 and cap 66. Cap 66, bead 62 and sleeve 68 are of a resilient flexible material which permits the cover to be attached and removed whereas plate 64 is of metal to provide sufficient strength to prevent ignition of fuze 48 upon ignition of the booster propellant and when cover 46 is in place. When cover 46 is removed, ignition of the booster propellant 38 ignites fuze 48 which in turn ignites the sustainer propellant charge 50.

Fins 18 are mounted on a plurality of pins 70 which are evenly spaced around the tail 56 and extend parallel to the axis of the round. The front end of each pin is journalled in a blind hole drilled in the annular, flat rearwardly facing end wall 72 of the body of the motor case while the rear end of each pin is supported by a lug 74 which extends rearwardly from the rear end of the tail 56, the pin being held in place by a setscrew 76. The number of lugs 74 is the same as the number of pins 70 and fins 18.

Each fin 18 comprises an elongated, curved body 78 whose transverse cross section is an airfoil designed to impart a spin, in the order of 15 to 30 revolutions per second, to the projectile assembly during flight to counteract any thrust malalignment, and to enable a rotational-armed fuze to be armed, if such type of fuze is provided in warhead 16.

Figure 2:
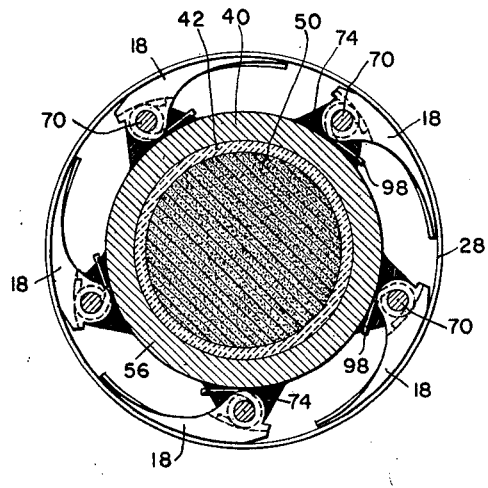
Figure 3:
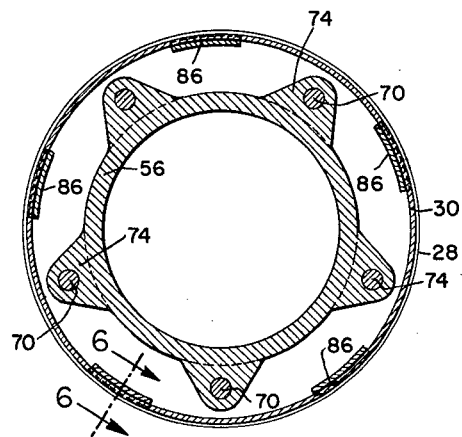

Each fin also includes a pair of longitudinally spaced hubs 80 provided with bores through which the associated pin 70 passes. Each of hubs 80 is of a substantially uniform diameter slightly less than the distance from the pin axis to the outer cylindrical surface of the adjacent portion of tail 56 so that the fin can rotate between a retracted position best seen in FIGURES 1 and 2 and an extended or flight stabilizing position best seen in FIGURES 4 and 5. When in the flight stabilizing position a shoulder 84, which extends along the inner edge of body 78, abuts the outer surface of the tail and acts as a stop member, the airfoil being designated to push the shoulder 84 against the tail and thereby impart rotation to the projectile assembly.

Each fin further includes a rearwardly extending tip 86 having a transverse groove 88 engaged with ridge 30 when the round is assembled, and a beveled rear edge 90 which facilitates insertion of the projectile assembly into the cartridge case.

Figure 6:
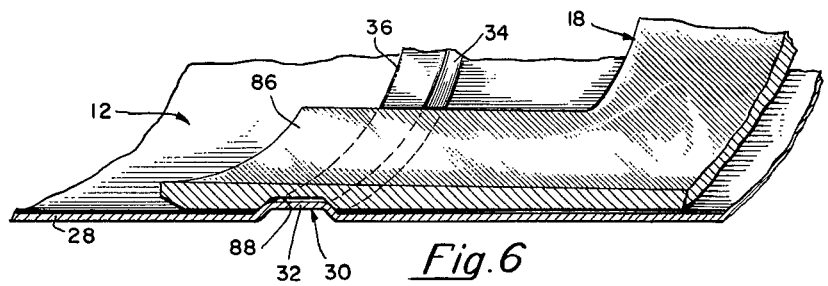
FIGURE 6 is an enlarged, perspective, sectional view along lines 6—6 of FIGURE 3.
Figure 7:
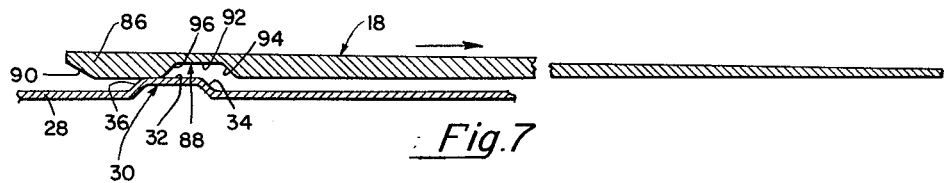
FIGURES 7 and 7A are longitudinal sectional views through a portion of a fin and the case illustrating a principle of operation thereof.
Figure 7A:
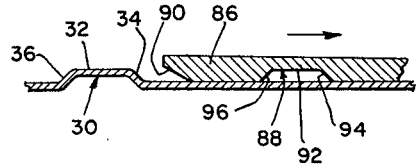

With reference to FIGURES 7 and 7A, each groove 88 has a longitudinal sectional shape similar to the shape of ridge 30, the groove comprising an arcuate portion 92 of uniform diameter bounded at its front end and its rear end by tapered shoulders 94 and 96, respectively, which abut tapered portions 34 and 36 when the round is assembled, as best seen in FIGURE 6.

Mounted on each of pins 70 are a pair of torsion springs 98 which bias the associated fin towards its extended position. Thus, when the round is assembled, springs 98 bias grooves 88 against ridge 30 with predetermined forces. When it is desired to dismantle the round to vary the booster charge or remove cover 46, fins 18 can be rotated against the bias of springs 98 to disengage grooves 88 from ridge 30 and thereby allow the projectile assembly to be pulled from the case.

In accordance with the well known laws of mechanics, the longitudinal forces necessary to cam the fins inwardly, when the round is assembled, and thereby disengage grooves 88 from ridge 30 are a function of the coefficients of friction between and the angles of the tapered shoulders 34, 36, 94 and 96, the angle being so chosen for the particular materials involved that the longitudinal forces are high enough to provide a shot start whereby the projectile assembly does not move upon firing until sufficient pressure has built up in the case for proper firing of the projectile assembly. Those forces are also high enough to prevent separation between the case and the projectile assembly where the round is loaded in a magazine subject to the recoil caused by firing a preceding round from the magazine. When the projectile assembly begins to move out of the case during firing of the round, shoulder 36 cams over shoulder 36 against the biasing force of springs 98 whereby the rear of tip 86 rides along portion 32 as shown in FIGURE 7 and then along the inside of the front end of the case, as shown in FIGURE 7A.

In order to fire the projectile assembly through a gun tube designed for spin stabilized projectiles, a slip obturator 20 is rotatably mounted on the rear of the body of the motor case and is held in place by a retainer ring 99 suitably seated in a groove in the body. Because of the relatively high inertia of the projectile assembly, the slip obturator is designed so that while it is rotated by the gun tube rifling at a high rate, the obturator slips relative to the motor case and thereby, because of the frictional engagement with the case, accelerates the projectile assembly to a relatively low rate of rotation which rate is at or near the rate at which the fins rotate the assembly during flight.

As previously indicated, the longitudinal forces necessary to uncouple grooves 88 and ridge 30 are dependent upon the coefficients of friction between the mating surfaces. Since these coefficients can vary widely, it may be desirable to employ the modified fin structure illustrated in FIGURES 8 and 8A.

Figure 8:
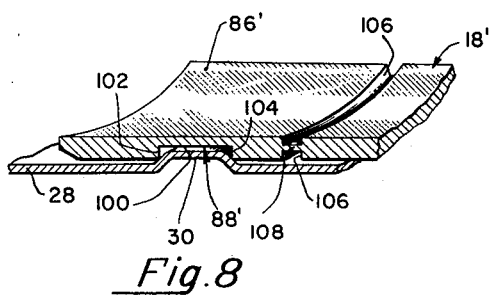
FIGURE 8 is a view similar to FIGURE 6 illustrating a modified fin structure.
Figure 8A:
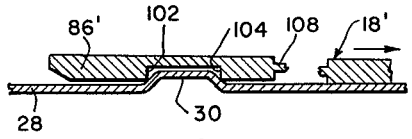
FIGURE 8A is a view similar to FIGURE 7 illustrating a principle of operation of the fin form shown in FIGURE 8.

Referring now to FIGURES 8 and 8A, there is shown a fin 18' constructed the same as fin 18 except for details of the tip. Fin 18' comprises a tip 86' having a transverse groove 88' engageable with ridge 30. Groove 88' comprises an arcuate portion 100 bounded at opposite ends by a pair of flat, annular, transverse shoulders 102 and 104 the outer corners of which are sharp and abut shoulders 34 and 36 as shown in FIGURE 8. Tip 86' also has a pair of opposed grooves 106 providing a frangible neck 108 therebetween. Upon firing, when the pressure with the cartridge case builds up, the corner of each shoulder 102 bites into shoulder 36 and thereby ruptures neck 108, as shown in FIGURE 8A allowing projection of the projectile assembly. Tip 86' thereby breaks off and does not travel with the assembly.

In operation, when it is desired to fire the round for maximum elevation, the round, prior to loading into the gun, is dismantled and cover 46 is removed. Then, the round is re-assembled and loaded into the gun. When the gun is fired, the projectile assembly is expelled from the cartridge case and travels through the gun tube. During the course of such travel, the fins 18 ride over the rifling. When the fins clear the gun tube, springs 98 move the fins to their flight stabilizing positions.

When it is desired to fire the round at ranges less than the maximum but as a rocket assisted round, the round is dismantled, prior to loading into the gun, and cover 46 and a portion of the booster charge 38 are removed.

Although designed as a rocket assisted round, round 10 can nevertheless be fired as merely a ballistic missile solely through the forces developed by the booster charge. Under such circumstances, cover 46 is not removed.

It will be apparent to those skilled in the art that changes can be made in the details and arrangements of parts without departing from the scope of the invention as defined in the appended claims.

What is claimed is:

1. A semi-fixed, fin-stabilized, artillery round comprising: a cartridge case adapted to hold a propelling charge; and a projectile assembly adapted to be fired from said case, said projectile assembly extending part-way into said case and having a plurality of pivotally mounted flight-stabilizing fins at least partly enclosed in said case; said fins and said case having interlockable portions which when in locked engagement prevent movement of said projectile assembly out of said case upon the application thereto of longitudinal forces less than a predetermined magnitude, bias means connected to said fins to urge the same in one direction of rotation so that said interlockable portions are in locked engagement, said fins being rotatable in an opposite direction radially inwardly away from the inner surfaces of said case; so as to disengage said interlockable portions to thereby allow movement of said projectile assembly out of said case upon the application thereto of longitudinal forces less than said predetermined magnitude, to permit adjustment of the amount of said propelling charge.

2. A semi-fixed, fin-stabilized, artillery round comprising: a cartridge case adapted to hold a propelling charge; and a projectile assembly adapted to be fired from said case, said projectile assembly being inserted into said case so as to enclose said charge; said projectile assembly having a plurality of pivotally mounted flight-stabilizing fins; said case and said fins having transversely extending, interlockable portions which when urged in locking engagement positively restrain said projectile assembly against longitudinal movement out of said case, except on the application thereto of a longitudinal force greater than a predetermined magnitude; bias means connected to said fins to urge the same in one direction of rotation so that said interlockable portions are in locked engagement and upon separation of said projectile assembly from said case to radially extended positions, said fins being rotatable in an opposite direction against said bias means to disengage said interlockable portions to allow said projectile assembly to be pulled from said case by applying a longitudinal force thereto substantially less than said predetermined magnitude.

3. A semi-fixed, fin-stabilized artillery round comprising: a cartridge case open at one end and adapted to hold a propelling charge; and a projectile assembly partly inserted into said open end and adapted to be fired from said case upon ignition of said propelling charge; said projectile assembly comprising a rocket motor having a propellant charge adapted to be ignited upon firing of said propelling charge and an axial rearwardly facing nozzle; said projectile assembly further comprising a plurality of flight-stabilizing fins pivotally mounted on said rocket motor and biased towards extended positions but held in retracted position by said case; said case and said fins having interlocked portions which prevent longitudinal movement of said projectile assembly relative to said case when subjected to recoil or to an impelling force less than a predetermined magnitude, said interlocked portions being disengageable upon movement of said fins against said bias to permit pulling said projectile assembly manually out of said case.

4. A round in accordance with claim 3 wherein said rocket motor comprises a nozzle cap covering said nozzle and operative to prevent ignition of said propellant charge, said cap being removable, whereby said projectile assembly can be fired either as an inertia round or a rocket assisted round.

5. A round in accordance with claim 3 wherein said interlocked portions comprise an inwardly projecting ridge on said case, and a plurality of rearwardly extending tips on said fins, said tips having groove means into which said ridge extends.

6. A round in accordance with claim 5 wherein:
said groove means and said ridge are so constructed and arranged that upon firing said fins cam over said ridge to disengage said case and said fins.

7. A round in accordance with claim 5 wherein:
said groove means, said tips and said ridge are so constructed and arranged that upon firing, said ridge breaks off tips to release said fins from said case.

References Cited by the Examiner

UNITED STATES PATENTS

| | | | |
|---|---|---|---|
| 993,917 | 5/11 | Voller | 102—38 |
| 1,225,497 | 5/17 | Rodzikevitch | 102—38 |
| 1,243,542 | 10/17 | Moore | 102—50 |
| 1,296,403 | 3/19 | Kindle | 102—50 |
| 1,417,460 | 5/22 | Driggs | 102—49 |
| 2,397,114 | 3/46 | Anzalone | 102—49 X |
| 2,866,413 | 12/58 | Rogue More | 102—49 |

SAMUEL FEINBERG, *Primary Examiner.*

ARTHUR M. HORTON, *Examiner.*